US012038161B2

(12) United States Patent
Chen

(10) Patent No.: US 12,038,161 B2
(45) Date of Patent: Jul. 16, 2024

(54) LIGHTING ASSEMBLY AND LIGHTING DEVICE

(71) Applicant: Shenzhen Habitat Technology Co., Ltd., Shenzhen (CN)

(72) Inventor: Jing Chen, Shenzhen (CN)

(73) Assignee: SHENZHEN HABITAT TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/402,777

(22) Filed: Jan. 3, 2024

(65) Prior Publication Data

US 2024/0133543 A1 Apr. 25, 2024

Related U.S. Application Data

(63) Continuation of application No. 18/075,443, filed on Dec. 6, 2022.

(30) Foreign Application Priority Data

Jan. 19, 2022 (CN) ......................... 202220140034.0

(51) Int. Cl.

| | |
|---|---|
| ***F21V 21/22*** | (2006.01) |
| ***F21S 9/02*** | (2006.01) |
| ***F21V 21/30*** | (2006.01) |
| ***F21V 23/06*** | (2006.01) |
| ***F21V 29/70*** | (2015.01) |

(52) U.S. Cl.

CPC ................ *F21V 21/22* (2013.01); *F21S 9/02* (2013.01); *F21V 21/30* (2013.01); *F21V 23/06* (2013.01); *F21V 29/70* (2015.01)

(58) Field of Classification Search

CPC .......... F21V 23/06; F21V 29/70; F21V 21/22; F21V 21/06; F21V 21/26-30; F21S 9/02; F21S 6/00

See application file for complete search history.

(56) References Cited

U.S. PATENT DOCUMENTS

2015/0192243 A1* 7/2015 Sharrah ..................... F21L 4/00 362/190

FOREIGN PATENT DOCUMENTS

WO WO-2021248911 A1 * 12/2021

OTHER PUBLICATIONS

Innovation Q+ NPL Search (Year: 2024).*

* cited by examiner

*Primary Examiner* — Anabel Ton

(74) *Attorney, Agent, or Firm* — Bayramoglu Law Offices LLC

(57) ABSTRACT

A lighting assembly and a lighting device are provided. The lighting assembly is U-shaped and includes a radiator, a light-emitting plate and a connector. The radiator is provided with a rotating groove and an avoidance notch communicated with the rotating groove. The rotating groove is provided on the inner side of the radiator, and the avoidance notch extends from the rotating groove to the edge of the radiator. The light-emitting plate is provided on the radiator and includes a plurality of light-emitting diode (LED) lamps in parallel and/or in series. The connector includes a first connecting part and a second connecting part. The first connecting part is configured to be connected to a free end of a telescopic assembly, and the second connecting part is placed in the rotating groove. The avoidance notch provides a space for the movement of the first connecting part.

11 Claims, 8 Drawing Sheets

LIGHTING ASSEMBLY AND LIGHTING DEVICE

CROSS REFERENCE TO THE RELATED APPLICATIONS

This application is the continuation application of U.S. application Ser. No. 18/075,443 filed on Dec. 6, 2022; U.S. application Ser. No. 18/075,443 is based upon and claims priority to Chinese Patent Application No. 202220140034.0, filed on Jan. 19, 2022, the entire contents of which are incorporated herein by reference.

TECHNICAL FIELD

The present disclosure relates to the technical field of lighting and in particular to a lighting assembly and a lighting device.

BACKGROUND

At present, the height of the lighting device is usually adjusted through a parallel four-bar structure or a hose structure, which generally has the problems of a small moving range, troublesome assembly and use, large volume, and inconvenient storage and carrying. In addition, the angle of the lighting device can only be adjusted in the vertical direction, and the range of adjustment is very limited, which is impossible to adjust from a larger angle. The design of the existing lighting device results in a poor user's experience.

SUMMARY

The present disclosure provides a lighting device, which solves the technical problems of the existing lighting device, such as small height and angle adjustment ranges and inconvenient use and carrying.

In the first aspect, the present invention provides a lighting assembly, where the lighting assembly is U-shaped and includes:

a radiator, where the radiator is provided with a rotating groove and an avoidance notch communicated with the rotating groove, the rotating groove is provided on an inner side of the radiator, and the avoidance notch extends from the rotating groove to an edge of the radiator;

a light-emitting plate, where the light-emitting plate is provided on the radiator and includes a plurality of light-emitting diode (LED) lamps in parallel and/or in series; and a connector, where the connector includes a first connecting part and a second connecting part, the first connecting part and the second connecting part are combined to form the T-shaped connector; the first connecting part is configured to be connected to a free end of a telescopic assembly, and the second connecting part is placed in the rotating groove; the avoidance notch provides a space in which the first connecting part moves to pass through the avoiding notch, so that the lighting assembly is allowed to pitch and rotate relative to the first connecting part with the second connecting part as a rotating shaft to switch a light-emitting direction of the light-emitting plate.

In the second aspect, the present invention provides a lighting device, including:

a base assembly;

a telescopic assembly, where the telescopic assembly is provided with a fixed end and a free end arranged oppositely along an axial direction of the telescopic assembly, the fixed end is connected to the base assembly, and the free end is configured to move relative to the fixed end to be close to and away from the base assembly; and the aforementioned lighting assembly, where the lighting assembly is provided on the free end.

In the third aspect, the present invention provides a lighting device, including:

a base assembly, where the base assembly is configured to be unfolded to form a tripod support state and also folded to form a closed grasping state;

a telescopic assembly, where the telescopic assembly is provided with a fixed end and a free end arranged oppositely along an axial direction of the telescopic assembly, the fixed end is connected to the base assembly, and the free end is configured to move relative to the fixed end to be close to and away from the base assembly; and a lighting assembly, where the lighting assembly includes a radiator and a light-emitting plate; the radiator is provided with an avoidance notch, and the avoidance notch extends from an inner side of the radiator to an edge of the radiator, so that the radiator is U-shaped; the light-emitting plate is provided on the radiator and includes a plurality of LED lamps in parallel and/or in series.

A free end of the telescopic assembly is rotatably connected to the radiator, and the avoidance notch provides a space for the movement of the free end of the telescopic assembly when the free end of the telescopic assembly rotates relative to the radiator. When the free end of the telescopic assembly moves in the avoidance notch, the radiator and the light-emitting plate pitch and swing synchronously to switch a light-emitting direction of the light-emitting plate.

The present invention provides alighting assembly and a lighting device. Since the lighting device can pitch and rotate relative to the first connecting part with the second connecting part as a rotating shaft, the light-emitting angle of the lighting element can be corrected in a larger range. Moreover, the avoidance notch communicated with the rotating groove provides a space for the movement of the first connecting part, and the first connecting part moves to pass through the avoiding notch, so that the structure of the lighting assembly becomes more compact.

BRIEF DESCRIPTION OF THE DRAWINGS

To describe the technical solutions in the embodiments or exemplary description of the present disclosure more clearly, the drawings required for the embodiments or exemplary description are briefly described below. The drawings in the following description show merely some embodiments of the present disclosure, and a person of ordinary skill in the art may still derive other drawings from these drawings without creative efforts.

REFERENCE NUMERALS

Figure 1:
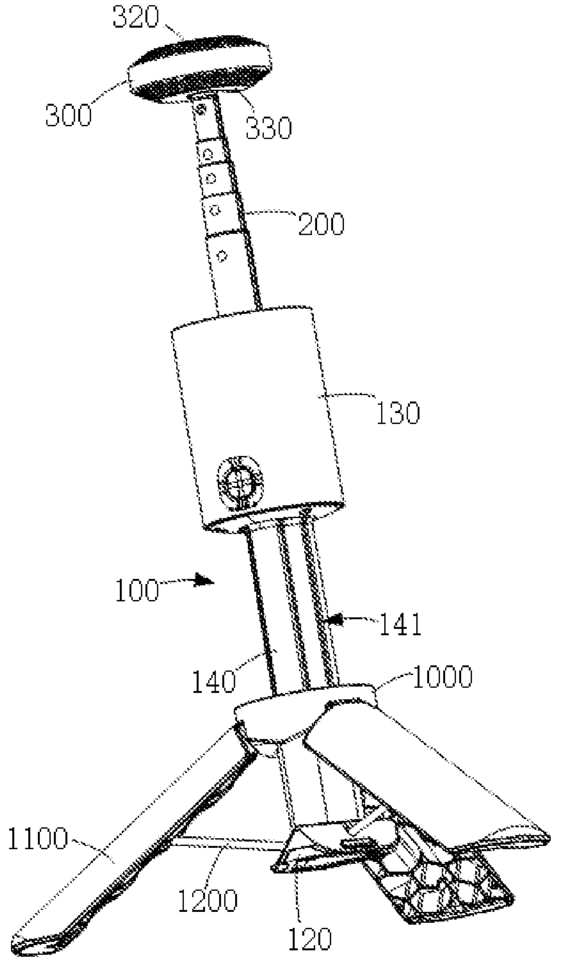
FIG. 1 is a structural view of a lighting device in a partially extended state according to an embodiment of the present disclosure.

100. base assembly; 110. circuit board; 120. base; 130. main body; 140. guide rail; 112. charging interface; 131. charging through-hole; 132. mounting through-hole; 113. power output interface; 133. power output through-hole; and 141. groove;
200. telescopic assembly; 210. fixed end; 220. free end; 200*a*, 200*b*. telescopic rod; 201. first rubber pad; and 202. second rubber pad;
300. lighting assembly; 310. lighting element; 320. radiator; 321. rotating groove; 3211. avoidance notch; 322. mounting groove; 330. transparent protective cover; and 340. radiator rear cover;
400. spring wire;
500. first connector; 510. connecting receptacle; 520. positive elastic piece; and 530. negative elastic piece;
600. second connector; 610. main wire; 620. connecting negative electrode; 630. connecting positive electrode; and 640. through groove;
700. connecting element; 710. first connecting part; 720. second connecting part; and 730. damping rubber ring;
800. battery;
900. dust cover;
1000. sliding element;
1100. support leg; 1110. rotating end; and 1120. magnetic suction piece;
1200. support rod; 1210. first connecting end; and 1220. second connecting end;
1300. support and fixing cover; and
1400. rubber pad element; and 1410. positioning post.

The implementation of the objective, functional characteristics, and advantages of the present disclosure will be further described below with reference to the embodiments and the drawings.

DETAILED DESCRIPTION OF THE EMBODIMENTS

The following clearly and completely describes the technical solutions in the embodiments of the present disclosure with reference to the drawings in the embodiments of the present disclosure. The described embodiments are merely a part, rather than all, of the embodiments of the present disclosure. All other embodiments obtained by those of ordinary skill in the art based on the embodiments of the present disclosure without creative efforts should fall within the protection scope of the present disclosure.

It should be noted that all the directional indications (such as upper, lower, left, right, front, and rear) in the embodiments of the present disclosure are merely used to explain relative position relationships or movement positions of the components in a specific orientation (as shown in the figures). If the specific orientation changes, the directional indication also changes accordingly.

Further, the technical solutions of the embodiments may be combined with each other on the basis that the combination is implementable by those of ordinary skill in the art. In case a combination of the technical solutions is contradictory or infeasible, such a combination is deemed not to fall within the protection scope of the present disclosure.

The present disclosure provides a lighting device.

As shown in FIGS. 1 to 6, the lighting device includes base assembly 100 provided therein with circuit board 110; telescopic assembly 200 provided with fixed end 210 and free end 220 that are arranged oppositely, where the fixed end 210 is connected to the base assembly 100; and lighting assembly 300 rotatably connected to the free end 220 to rotate axially and radially along the free end 220, where the lighting assembly 300 is provided with lighting element 310 electrically connected to the circuit board 110.

The base assembly 100 may be placed on the ground or adsorbed to an iron article. The base assembly 100 may also be adsorbed in a region at a high position such as an iron ceiling to realize a different use scenario. The use scenarios of the lighting device are not limited herein.

The telescopic assembly 200 can adapt to lighting scenarios of different heights. The length of the telescopic assembly 200 may also be appropriately increased according to different lighting scenarios. To store the lighting device, the telescopic assembly 200 is retracted such that the lighting assembly 300 and the base assembly 100 can be stored together, thereby reducing the occupied space of the lighting device and facilitating the carrying of the lighting device.

The free end 220 is an end that can be stretched or contracted, and the fixed end 210 is an end that is configured to fix the telescopic assembly 200. When the telescopic assembly 200 is in a storage state, the free end 220 is stored in the fixed end 210. When the free end 220 is pulled out from the fixed end 210, the telescopic assembly 200 is in an extended state. Of course, in this embodiment, the telescopic assembly 200 further has a fully extended or partially extended state, which can be set according to the actual lighting scenario of the lighting device and is not limited herein.

Further, the lighting assembly 300 is provided on the free end 220 of the telescopic assembly 200. The lighting assembly 300 can move in a direction away from the fixed end 210 with the extension of the free end 220, thereby increasing the height of the lighting assembly 300. Alternatively, the lighting assembly 300 can move in a direction toward the fixed end 210 with the retraction of the free end 220, thereby reducing the height of the lighting assembly 300. In addition, since the lighting assembly 300 is rotatably connected to the free end 220, the lighting assembly 300 is rotatable axially and radially along the free end 220. Therefore, the lighting element 310 is adjustable in height and is rotatable axially and radially along the free end 220.

The lighting element 310 is a light-emitting plate, which may include a plurality of light-emitting diode (LED) lamps in parallel and/or in series, and the plurality of LED lamps in parallel and/or in series together construct a light-emitting surface of the light-emitting plate.

In the technical solution provided by the present disclosure, the extension and retraction of the lighting assembly 300 and the lighting element 310 are realized through the telescopic assembly 200, such that the height adjustment of the lighting device can be realized in a large range, which is convenient for storage and carrying. Since the lighting assembly 300 is movably connected to the free end 220, the lighting assembly 300 is rotatable axially and radially along the free end 220. That is, the angle of the lighting assembly 300 can be adjusted in the horizontal and vertical directions to meet different lighting angles, thereby improving the user's experience.

In this embodiment, the base assembly 100 includes base 120, and main body 130 and guide rail element 140 both of which are hollow-through. The guide rail element 140 has one end connected to the main body 130 and the other end connected to the base 120. An inner space of the main body 130 is communicated with an inner space of the guide rail element 140. The circuit board 110 is provided in the main body 130. The fixed end 210 passes through the inner space of the main body 130 and the inner space of the guide rail element 140 in sequence and is connected to the base 120.

Therefore, the base assembly 100 may be placed on the ground or adsorbed to an iron article to realize a different use scenario, which is not limited herein.

The main body 130 is separated from the base 120 through the guide rail element 140. In this embodiment, in order to fix the fixed end 210 of the telescopic assembly 200, the main body 130 and the guide rail element 140 are arranged in a hollow-through structure, and the inner space of the main body 130 is coaxial with the inner space of the guide rail element 140. The fixing end 210 can directly pass through the inner space of the main body 130 and the inner space of the guide rail element 140 and be fixed to the base 120. In this way, the telescopic assembly 200 can be stored in the inner space of the main body 130 and the inner space of the guide rail element 140, thereby reducing the space occupied by the telescopic assembly 200.

The circuit board 110 is provided in the main body 130. Of course, in this embodiment, the circuit board 100 may also be provided in the base 120 to omit the main body 130, thereby saving costs.

Optionally, the guide rail element 140 may be connected and combined with the main body 130 and the base 120 by one or more means such as clips, bolts, screws, rivets, and viscous materials, which is not limited herein.

Further, the lighting device further includes spring wire 400 provided with one end electrically connected to the circuit board 110; and first connector 500 and second connector 600 that are electrically connected. The first connector 500 and the second connector 600 are arranged inside the telescopic assembly 200 at the free end 220. The other end of the spring wire 400 passes through a gap between the telescopic assembly 200 and the guide rail element 140, then bends and extends into the telescopic assembly 200, and is electrically connected to the first connector 500. The second connector 600 is electrically connected to the lighting element 310.

The maximum outer diameter of the telescopic assembly 200 is smaller than an inner diameter of the guide rail element 140, such that the gap is formed between the telescopic assembly 200 and the guide rail element 140. Thus, one end of the spring wire 400 is electrically connected to the circuit board 110. The other end of the spring wire passes through the gap, bends and extends to the interior of the telescopic assembly 200, and is electrically connected to the first connector 500. The first connector 500 is electrically connected to the second connector 600, and the second connector 600 is electrically connected to the lighting element 310. That is, the circuit board 110 is electrically connected to the lighting element 310 through the spring wire 400, the first connector 500, and the second connector 600, thereby controlling the lighting state of the lighting element 310.

Further, in order to electrically connect the first connector 500 and the second connector 600, the first connector 500 may be provided with connecting receptacle 510. The first connector 500 includes positive elastic piece 520 and negative elastic piece 530 both of which are connected to the other end of the spring wire 400. The positive elastic piece 520 and the negative elastic piece 530 are exposed from the inside of the connecting receptacle 510. The second connector 600 includes main wire 610, connecting negative electrode 620, and connecting positive electrode 630 all of which are electrically connected to the main wire 610. The cross-sectional area of the connecting negative electrode 620 is greater than the cross-sectional area of the connecting positive electrode 630. The connecting negative electrode 620 is provided with through groove 640 along the direction of the connecting positive electrode 630, and the connecting positive electrode 630 is provided in the through groove 640 and insulated from the connecting negative electrode 620. The connecting positive electrode 630 has a length greater than the length of the connecting negative electrode 620. The connecting positive electrode 630 and the connecting negative electrode 620 are inserted into the connecting receptacle 510. The connecting positive electrode 630 is fitted to the positive elastic piece 520 in an elastic manner. The connecting negative electrode 620 is fitted to the negative elastic piece 530 in the elastic manner. The main wire 610 is electrically connected to the lighting element 310.

The connecting positive electrode 630 of the second connector 600 is inserted in the connecting receptacle 510 of the first connector 500, such that the connecting positive electrode 630 is fitted to the positive elastic piece 520 in the elastic manner to realize point-contact conductivity. The connecting negative electrode 620 of the second connector 600 is fitted to the negative elastic piece 530 in the elastic manner to realize point-contact conductivity. The first connector 500 and the second connector 600 are electrically connected.

Optionally, the gap between the connecting positive electrode 630 and the connecting negative electrode 620 may be filled with an insulating material. Alternatively, an insulating material such as insulating glue is provided on the surface of the connecting positive electrode 630 or the connecting negative electrode 620. The insulation design is not limited herein.

Figure 7:
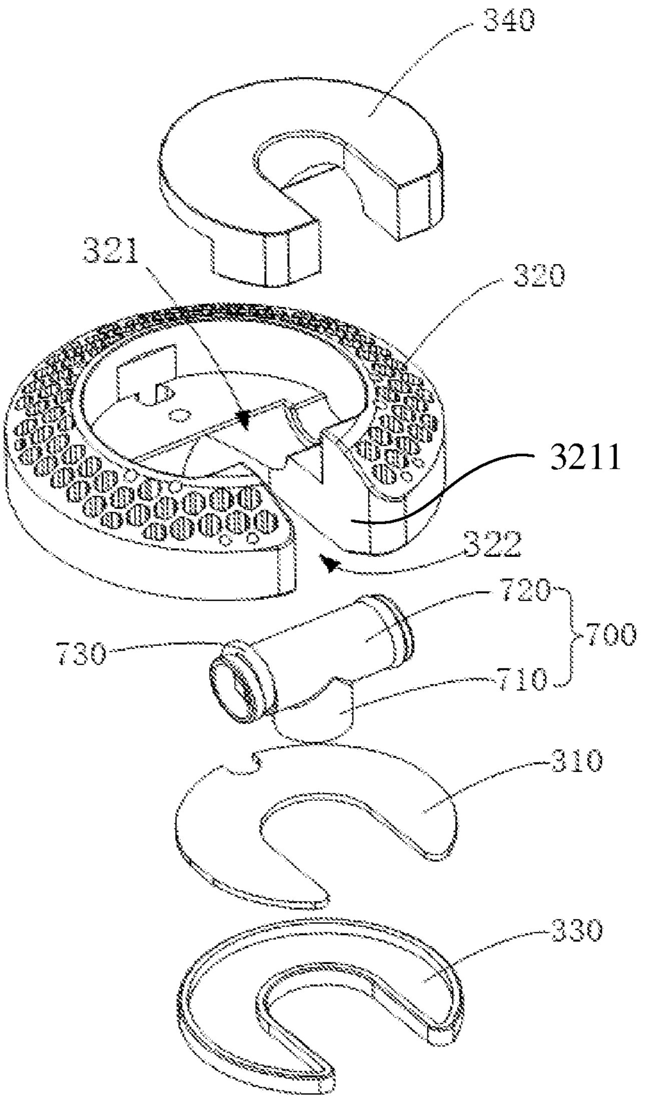
FIG. 7 is an exploded view of a lighting assembly and a connecting element according to an embodiment of the present disclosure.

Further, referring to FIG. 7, the lighting assembly 300 further includes radiator 320. The radiator 320 is provided with rotating groove 321 and avoidance notch 3211 communicated with the rotating groove 321. The rotating groove 321 is provided on the inner side of the radiator 320, and the avoidance notch 3211 extends from the rotating groove 321 to the edge of the radiator 320. The lighting element 310 is fitted to the radiator 320 to dissipate heat of the lighting element 310 through the radiator 320. The lighting element 310 is in close contact with the radiator 320 to effectively guide the working heat to the radiator 320 to protect the lighting element 310 from damage due to high temperature. A side of the radiator 320 away from the rotating groove 321 is provided with mounting groove 322, and the lighting element 310 is provided in the mounting groove 322. FIG. 7 shows that the light-emitting surface of the light-emitting plate (lighting element 310) is perpendicular to the thickness direction of the radiator 320.

Optionally, the radiator 320 is made of an aluminum alloy. Alternatively, the radiator 320 may be made of other material with high heat dissipation performance, which is not limited herein.

In order to protect the lighting element 310, the lighting assembly further includes transparent protective cover 330. The transparent protective cover 330 is provided on the mounting groove 322 to protect the lighting element 310. Light from the lighting element 310 can directly penetrate the transparent protective cover 330, such that the light can be uniformly scattered to realize a good lighting effect.

Further, the lighting assembly 300 includes radiator rear cover 340 that covers the rotating groove 321. The working heat of the lighting element 310 is transmitted to the radiator 320 and the radiator rear cover 340 to protect the lighting element 310 from damage.

Further, in order to realize the rotation of the lighting assembly 300 around the free end 220, the lighting device includes connecting element 700. The connecting element 700 has first connecting part 710 and second connecting part 720 connected to the first connecting part 710. The first connecting part 710 is inserted at the free end 220 and connected to the second connector 600 in the telescopic assembly 200. The connecting element 700 is rotated with the first connecting part 710 as a rotating shaft. The second connecting part 720 is provided in the rotating groove 321, and the lighting assembly 300 is rotated with the second connecting part 720 as a rotating shaft, so that the light-emitting surface of the lighting element 310 (light-emitting plate) is switched between a vertical downward facing state (FIGS. 1, 3 and 4) and an inclined downward facing state (FIG. 2). When the light-emitting surface of the light-emitting plate is switched from the vertical downward facing state to the inclined downward facing state, that is, when the light-emitting plate is switched from FIG. 1 to FIG. 2, the avoidance notch 3211 provides a space for the movement of the first connecting part 710, so that the first connecting part 710 moves to pass through the avoidance notch 3211 (as shown in FIG. 2).

Optionally, the connecting element 700 is a T-shaped connector. The first connecting part 710 of the T-shaped connector is inserted at the free end 220 and connected to the second connector 600 in the telescopic assembly 200. The second connecting part 720 of the T-shaped connector is provided in the rotating groove 321 to make the lighting assembly 300 rotate axially and radially along the free end 220.

Further, a portion where the connecting positive electrode 630 exceeds the connecting negative electrode 620 has a circular structure, and the connecting receptacle 510 is a circular connecting receptacle. After the connecting positive electrode 630 with the circular structure is inserted into the circular connecting receptacle, the second connector 600 and the first connector 500 can realize 360° infinite rotation while being electrically connected.

Further, the lighting device includes damping rubber ring 730. The damping rubber ring 730 is sleeved on the periphery of the second connecting part 720 to improve friction between the second connecting part 720 and the radiator 320 during rotation. In this way, the second connecting part is not easily loosened or shaken or does not make abnormal noises, and its hand sensory feel is improved.

An interior of the first connecting part 710 is communicated with an interior of the second connecting part 720. The main wire 610 passes through the interior of the first connecting part 710 and the interior of the second connecting part 720 in sequence and is electrically connected to the lighting element 310.

The second connector 600 is externally provided with a telescopic tube rubber sleeve. An outer wall of the telescopic tube rubber sleeve is closely connected to the telescopic assembly 200. The second connector 600 has a smaller end passing through the telescopic tube rubber sleeve and a larger end with a diameter greater than the inner diameter of the telescopic tube rubber sleeve, such that the larger end of the second connector 600 is clamped inside the telescopic assembly 200 by the telescopic tube rubber sleeve without falling out. Meanwhile, due to the circular plug-in design between the telescopic tube rubber sleeve and the second connector 600, the second connector 600 and the telescopic tube rubber sleeve are rotatable relatively.

Figure 2:
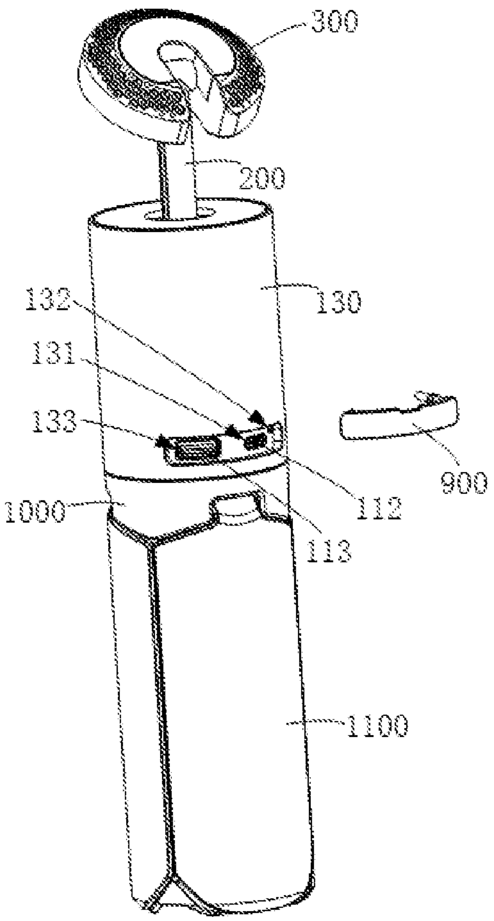
FIG. 2 is a structural view of the lighting device in a retracted state according to an embodiment of the present disclosure.
Figure 3:
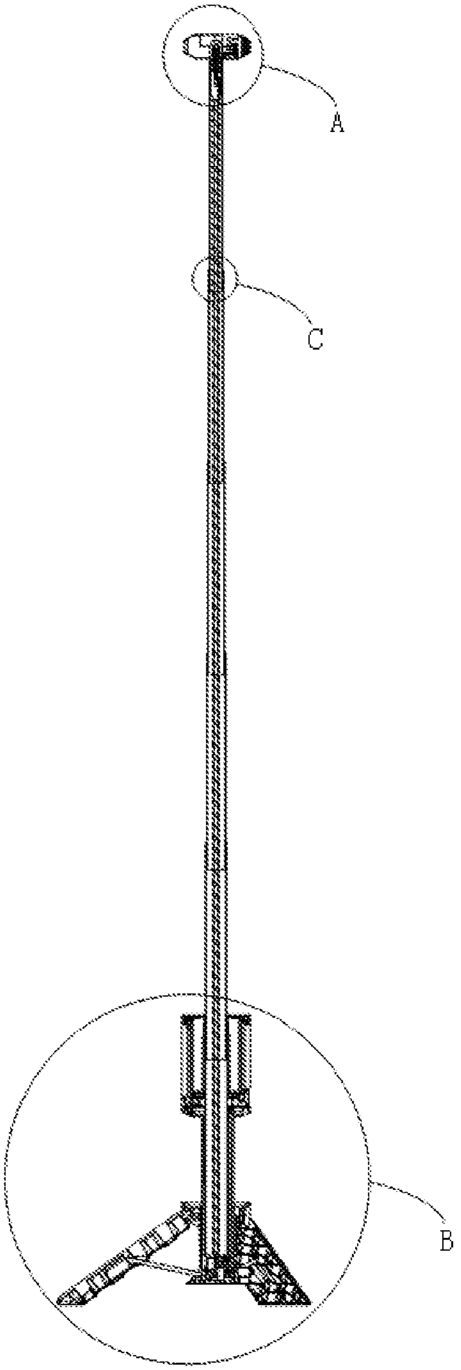
FIG. 3 is a perspective view of the lighting device in a fully extended state according to an embodiment of the present disclosure.
Figure 4:
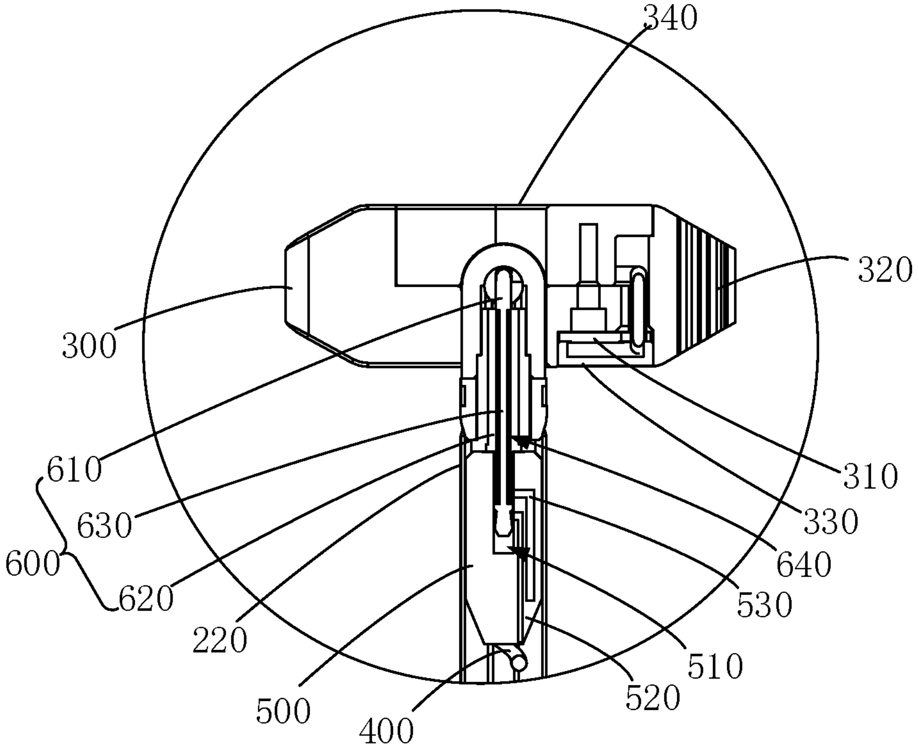
FIG. 4 is an enlarged view of A shown in FIG. 3.
Figure 5:
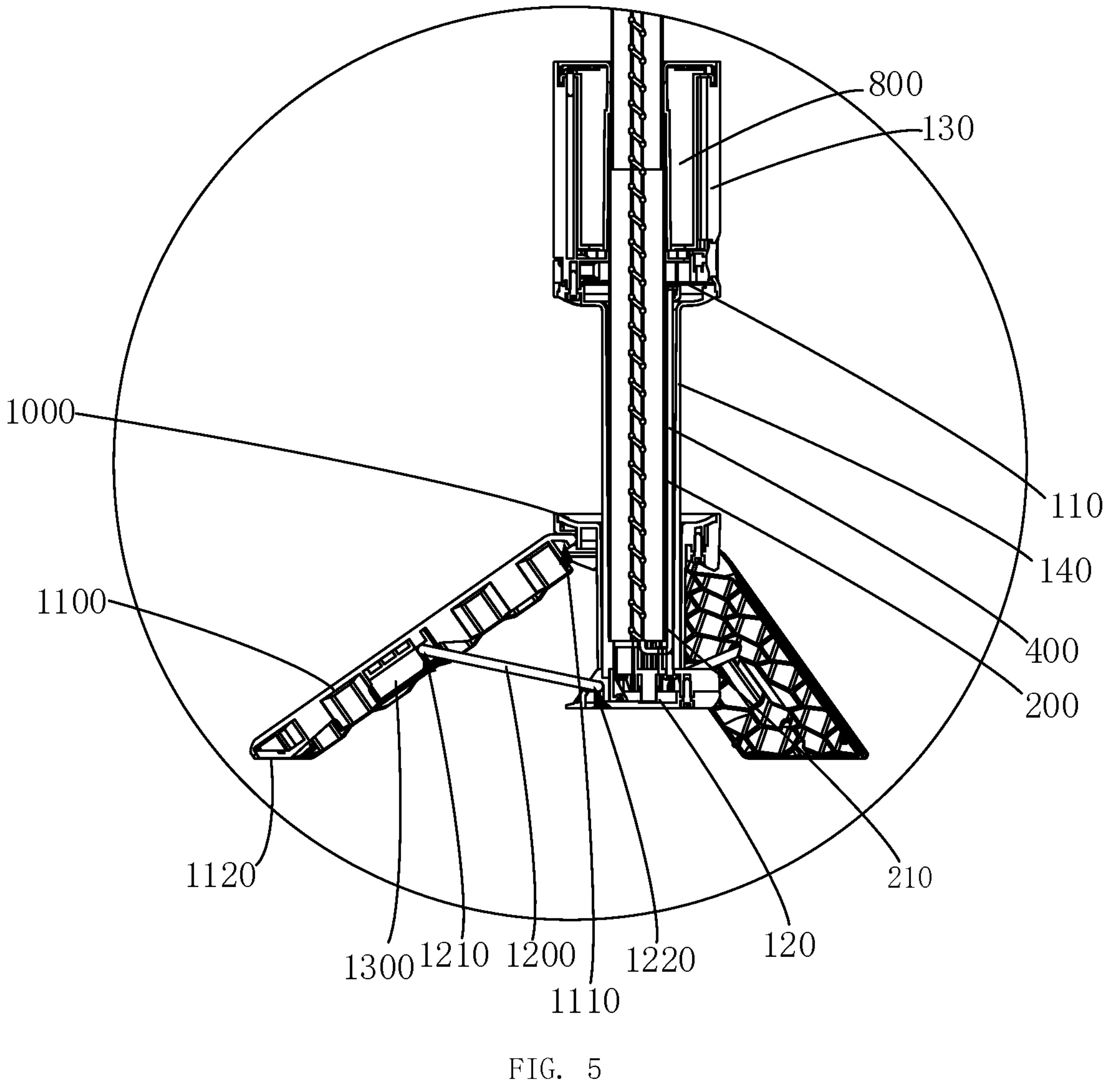
FIG. 5 is an enlarged view of B shown in FIG. 3.

Referring to FIGS. 1, 2, and 5, the circuit board 110 is provided with charging interface 112. The main body 130 is provided with charging through-hole 131 and mounting through-hole 132 both of which run through an outer wall. The charging interface 112 is exposed from the charging through-hole 131. The lighting device further includes battery 800. The battery 800 is provided in the main body 130 and is electrically connected to the circuit board 110. An external power supply device passes through the charging through-hole 131 to be connected to the charging interface 112 to charge the battery 800. The lighting device further includes dust cover 900. The dust cover 900 is provided in the mounting through-hole 132 and covers the charging through-hole 131.

Of course, in this embodiment, the circuit board 110 is provided with a power output interface 113. The main body 130 is further provided with power output through-hole 133 running through the outer wall. The power output interface 113 is exposed from the power output through-hole 133. The power output interface 113 may be connected to an external electric device (such as a mobile phone or tablet) to charge the electric device.

Of course, the circuit board 110 is further integrated with a power key, a power indicator, and other components that are exposed to the main body 130.

The dust cover 900 is clamped in the mounting through-hole 132 through a clamping point, such that the dust cover 900 will not be separated from the main body 130. An outer wall of the dust cover 900 is provided with a protruding clamping point, and an outer shell of the main body is provided with a clamping point groove. The protruding clamping point and the clamping point groove are fitted with each other. When the charging interface is not used, the dust cover 900 can be tightly fitted to an outside of the charging through-hole 131 and the power output through-hole 133 due to the tight fit between the protruding clamping point and the clamping point groove. The dustproof plug can effectively protect dust and other foreign matters from entering the lighting device to realize a dustproof and beautiful effect. In addition, the dust cover 900 may be provided with a pull position to open the dust cover 900.

Figure 8:
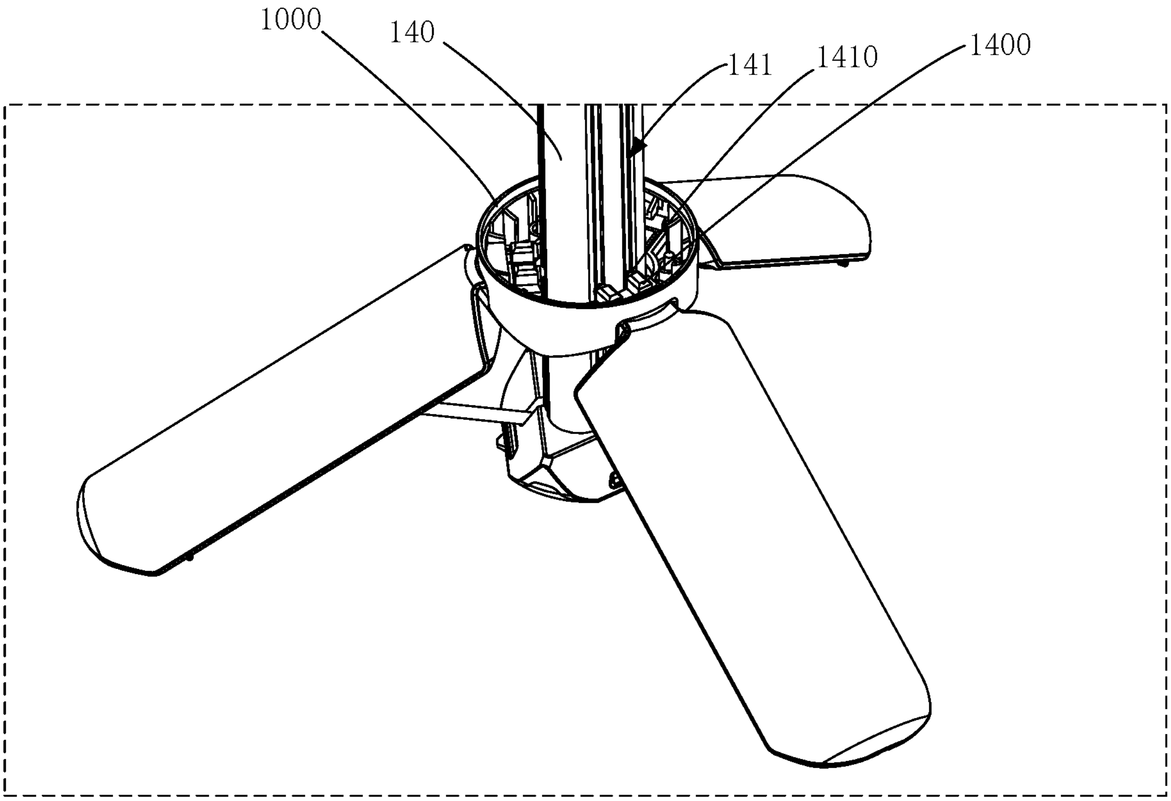
FIG. 8 is a schematic view of a sliding element, a guide rail element, and a rubber pad element that are combined together according to an embodiment of the present disclosure.

Referring to FIGS. 1, 5, and 8, in this embodiment, in order to improve the stability of the base assembly 100, the lighting device further includes sliding element 1000, a plurality of support legs 1100, support rod 1200, and support and fixing cover 1300. The sliding element 1000 is slidably sleeved on the guide rail element 140. The support legs 1100 each are provided with rotating end 1110, and the rotating end 1110 is rotatably connected to the sliding element 1000, such that the support legs 1100 each are rotatable toward or away from the sliding element 1000 with the rotating end 1110 as a rotating shaft. The support rod 1200 is provided with first connecting end 1210 and second connecting end 1220 that are arranged oppositely. The first connecting end 1210 is rotatably connected to a central part of the support leg 1100 through the support and fixing cover 1300. The second connecting end 1220 is rotatably connected to the base 120.

The sliding element 1000 is slidable freely on the guide rail element 140. The sliding element 1000 is configured to move to the bottommost position to contact the base 120, and the sliding element will not slide out of the guide member 140 due to the limitation by the base 120. The support legs 1100 each are connected and fixed to sliding element 1000 through the rotating end 1110. The support legs 1100 each are rotated with the rotating end 1110 as a rotating shaft. The support rod 1200 is provided between the support leg 1100 and the base 120. The support rod 1200 has one end close to the support leg 1100 serving as the first connecting end 1210 and the other end close to the base 120 serving as the second connecting end 1220. The support rod 1200 rotates with the first connecting end 1210 as the rotating shaft. Alternatively, the support rod 1200 is rotated with the second connecting end 1220 as a rotating shaft. The rotating end 1110, the first connecting end 1210, and the second connecting end 1220 form a triangular structure. That is, the support leg 1100, the support rod 1200, and the sliding element 1000 form a triangle structure, which provides high stability and strength.

When the sliding element 1000 is forced to move towards the base 120, the distance between the rotating end 1110 and the second connecting end 1220 is shortened. The downward pressure of the sliding element 1000 and the upward supporting force of the base 120 generate a resultant force toward the first connecting end 1210. The support leg 1100 is opened outward under the action of the resultant force. That is, the support leg 1100 is opened to increase the radius of a ground support point. The design effectively improves the stability of the lighting device when the lighting device stands, such that the lighting device can stand stably when tilted.

Correspondingly, when the sliding element 1000 is pulled upward, the acting force is the opposite. The support leg 1100 is closed inward under this force. Therefore, the support leg 1100 can be opened and closed by moving the sliding element 1000. In the storage state, the lighting device has a smaller volume and is easy to carry.

Further, a plurality of grooves 141 are arranged on an outer wall of the guide rail element 140. The lighting device further includes a plurality of rubber pad elements 1400. The plurality of rubber pad elements 1400 are arranged in the sliding element 1000. A plurality of positioning posts 1410 are provided on surfaces of the rubber pad elements 1400 away from the sliding element 1000. The positioning posts 1410 each are arranged in one groove 141.

There is a gap between the inner side of the sliding element 1000 and the outer side of the guide rail element 140. In this embodiment, in order to prevent the sliding element 1000 from loosening, the rubber pad elements 1400 are provided in the gap between the inner side of the sliding element 1000 and the outer side of the guide rail element 140. One side of each of the rubber pad elements 1400 is provided in the sliding element 1000, and the surface of each of the rubber pad elements 1400 away from the sliding element 1000 is provided with the positioning post 1410. The positioning posts 1410 are embedded in the grooves 141, such that the rubber pad elements 1400 and the grooves 141 are always squeezed and stressed, thereby increasing the friction between the sliding element 1000 and the guide rail element 140.

A side of each of the support legs 1100 away from the rotating end 1110 is provided with magnetic suction piece 1120. When the base assembly 100 is fixed on a wall, a floor, or a ceiling, the base assembly is adsorbed onto a magnetic material on the wall, the floor, or the ceiling through the magnetic suction piece 1120. The design further strengthens the lighting device, improves the stability of the lighting device, and prevents the light from shaking.

Optionally, the magnetic suction piece 1120 may be a strong magnet, and the magnetic material may also be a strong magnet. Alternatively, the magnetic suction piece 1120 may be a strong magnet, and the magnetic material may be a material that can be adsorbed by the magnet, such as iron, cobalt, nickel or an alloy thereof. Alternatively, the magnetic suction piece 1120 may be a material that can be adsorbed by the magnet, such as iron, cobalt, nickel, or an alloy thereof, and the magnetic material may be a strong magnet. The materials of the magnetic suction piece and magnetic material are not limited herein.

Further, in order to realize the extension and retraction of the telescopic assembly 200, the telescopic assembly 200 includes a plurality of telescopic rods connected head-to-tail. The inner diameters of the telescopic rods decrease progressively from the fixed end 210 to the free end 220. When the telescopic assembly 200 is in an extended state, the inner diameters of telescopic rods gradually decrease in a direction from the base assembly 100 to the lighting assembly 300. That is, the inner diameter of the telescopic rod closest to the base assembly 100 is the largest, such that other telescopic rods can be stored in the telescopic rod with the largest inner diameter.

Figure 6:
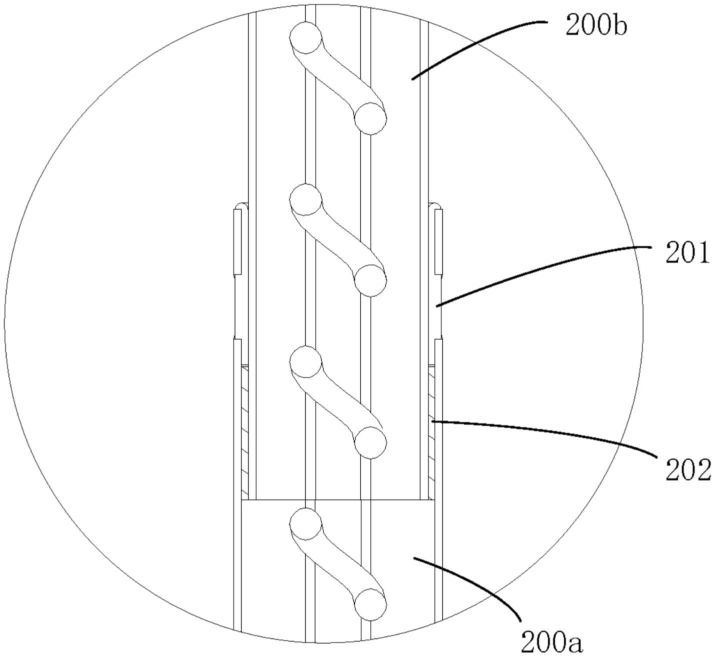
FIG. 6 is an enlarged view of C shown in FIG. 3.

Further, it is necessary to prevent one telescopic rod from separating from the other telescopic rod during the extension process. Referring to FIG. 6, taking telescopic rod **200*a* and telescopic rod 200*b* as examples, the inner side of the head of the telescopic rod 200*a* is provided with first rubber pad 201, and the outer side of the tail of the telescopic rod 200*b* is provided with second rubber pad 202. The outer diameter of the second rubber pad 202 is greater than the inner diameter of the first rubber pad 201. When the tail of the telescopic rod 200*b* is sleeved on the head of the telescopic rod 200*a* and the telescopic rod 200*b* extends away from the telescopic rod 200*a*, the second rubber pad 202 is clamped at the first rubber pad 201 to prevent the telescopic rod 200*b* from sliding out of the telescopic rod 200*a*** during the extension process. Every two adjacent telescopic rods are limited at a connection thereof by rubber pads, or by other soft materials. The limiting means are not limited herein.

The first rubber pad 201 and the first telescopic rod **200*a*, as well as the second rubber pad 202 and the telescopic rod 200*b*, are connected by adhesive glue or other means. The design realizes the stable connection between the first rubber pad 201 and the telescopic rod 200*a*, as well as between the second rubber pad 202 and the telescopic rod 200*b***.

Optionally, the telescopic rods are made of aluminum. Alternatively, the telescopic rods may also be made of other materials, such as aluminum alloy, copper, iron, or a composite material, which is not limited herein.

In conclusion, the lighting device includes the base assembly 100 provided therein with the circuit board 110; the telescopic assembly 200 provided with the fixed end 210 and the free end 220 that are arranged oppositely, where the fixed end 210 is connected to the base assembly 100; and the lighting assembly 300 rotatably connected to the free end 220 to rotate axially and radially along the free end 220, where the lighting assembly 300 is provided with the lighting element 310 electrically connected to the circuit board 110. The extension and retraction of the lighting assembly 300 and the lighting element 310 are realized through the telescopic assembly 200, such that the height adjustment of the lighting device can be realized in a large range, which is convenient for storage and carrying. Since the lighting assembly 300 is movably connected to the free end 220, the lighting assembly 300 is rotatable axially and radially along the free end 220. That is, the angle of the lighting assembly 300 can be adjusted in the horizontal and vertical directions to meet different lighting angles, thereby improving the user's experience.

The foregoing are merely preferred embodiments of the present disclosure, and the scope of the present disclosure is not limited thereto. Any equivalent change made based on the content of the specification and drawings under the inventive concept of the present disclosure or direct/indirect application thereof in other related technical fields should fall within the protection scope of the present disclosure.

What is claimed is:

1. A lighting assembly, wherein the lighting assembly is U-shaped and comprises:

a radiator, wherein the radiator is provided with a rotating groove and an avoidance notch communicated with the rotating groove, the rotating groove is provided on an inner side of the radiator, and the avoidance notch extends from the rotating groove to an edge of the radiator;

a light-emitting plate, wherein the light-emitting plate is provided on the radiator and comprises a plurality of light-emitting diode (LED) lamps in parallel or in series; and a connector, wherein the connector comprises a first connecting part and a second connecting part, wherein the first connecting part and the second connecting part are combined to form the T-shaped connector; the first connecting part is configured to be connected to a free end of a telescopic assembly, and the second connecting part is placed in the rotating groove; the avoidance notch provides a space in which the first connecting part moves to pass through the avoiding notch, so that the lighting assembly is allowed to pitch and rotate relative to the first connecting part with the second connecting part as a rotating shaft to switch a light-emitting direction of the light-emitting plate.

2. The lighting assembly according to claim 1, wherein the plurality of LED lamps in parallel or in series together construct a light-emitting surface of the light-emitting plate; the lighting assembly is allowed to pitch and rotate relative to the first connecting part with the second connecting part as the rotating shaft, so that the light-emitting surface of the light-emitting plate is switched between a vertical downward facing state and an inclined downward facing state; when the light-emitting surface of the light-emitting plate is switched from the vertical downward facing state to the inclined downward facing state, the avoidance notch provides the space for the movement of the first connecting part, so that the first connecting part moves to pass through the avoidance notch.

3. The lighting assembly according to claim 1, wherein an interior of the first connecting part is communicated with an interior of the second connecting part, wherein a wire is configured to pass through the interior of the first connecting part and the interior of the second connecting part to connect the light-emitting plate to a power supply.

4. The lighting assembly according to claim 1, further comprising a damping rubber ring, wherein the damping rubber ring is sleeved on a periphery of the second connecting part and is in contact with the radiator.

5. The lighting assembly according to claim 1, wherein the lighting assembly is further allowed to rotate horizontally with the first connecting part as a rotating shaft to switch a horizontal angle of the light-emitting plate.

6. The lighting assembly according to claim 1, wherein a side of the radiator away from the rotating groove is provided with a mounting groove, and the light-emitting plate is provided in the mounting groove; the lighting assembly further comprises a transparent protective cover, and the transparent protective cover is provided on the light-emitting plate and the mounting groove.

7. A lighting device, comprising:

a base assembly;

a telescopic assembly, wherein the telescopic assembly is provided with a fixed end and a free end, wherein the fixed end and the free end are arranged oppositely along an axial direction of the telescopic assembly, the fixed end is connected to the base assembly, and the free end is configured to move relative to the fixed end to be close to and away from the base assembly; and the lighting assembly according to claim 1, wherein the lighting assembly is provided on the free end.

8. The lighting device according to claim 7, wherein an interior of the first connecting part is communicated with an interior of the second connecting part; the base assembly is provided with a circuit board; the lighting device further comprises a spring wire and a main wire; a first end of the spring wire is electrically connected to the circuit board, and a second end of the spring wire is electrically connected to the main wire; the main wire passes through the interior of the first connecting part and the interior of the second connecting part in sequence and is electrically connected to the light-emitting plate.

9. The lighting device according to claim 8, wherein the base assembly comprises a base, a main body and a guide rail element, wherein the main body and the guide rail element are hollow-through; wherein the guide rail element has a first end connected to the main body and a second end connected to the base; an inner space of the main body is communicated with an inner space of the guide rail element; the circuit board is provided in the main body; the fixed end passes through the inner space of the main body and the inner space of the guide rail element in sequence and is connected to the base; the lighting device further comprises a sliding element and a plurality of support legs, wherein the sliding element is slidably sleeved on the guide rail element; each of the plurality of support legs is provided with a rotating end, and the rotating end is rotatably connected to the sliding element, such that each of the plurality of support legs is rotatable toward or away from the sliding element with the rotating end as a rotating shaft.

10. The lighting device according to claim 9, further comprising a support rod and a support and fixing cover, wherein the support rod is provided with a first connecting end and a second connecting end arranged oppositely; the first connecting end is rotatably connected to a central part of each of the plurality of support legs through the support and fixing cover; and the second connecting end is rotatably connected to the base.

11. The lighting device according to claim 9, wherein an outer wall of the guide rail element is provided with a plurality of grooves; and the lighting device further comprises a plurality of rubber pad elements, wherein the plurality of rubber pad elements are provided in the sliding element, a plurality of positioning posts are provided on surfaces of the plurality of rubber pad elements away from the sliding element, and the plurality of positioning posts are respectively provided in the plurality of grooves.

* * * * *